Figure 13:
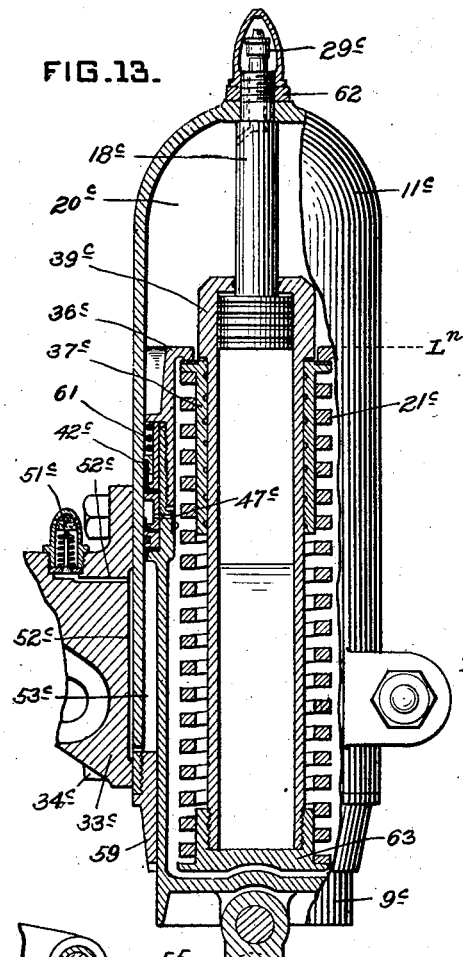

April 12, 1927.
F. L. O. WADSWORTH
1,624,643
ELASTIC SUPPORT SYSTEM FOR VEHICLES
Filed Dec. 16, 1922  4 Sheets-Sheet 1
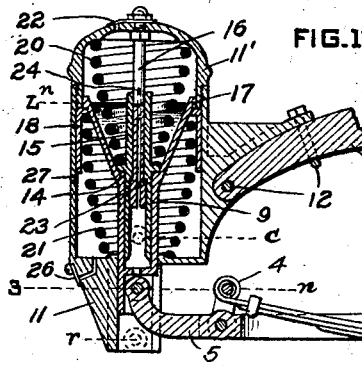
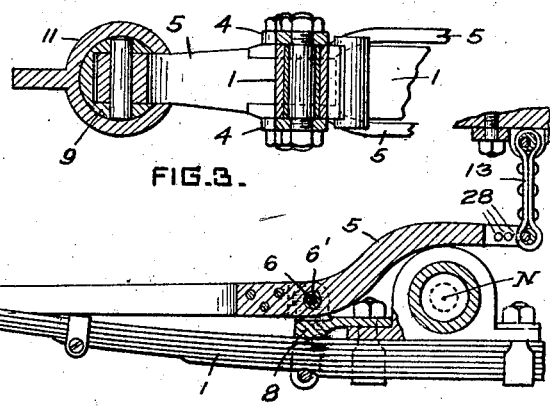
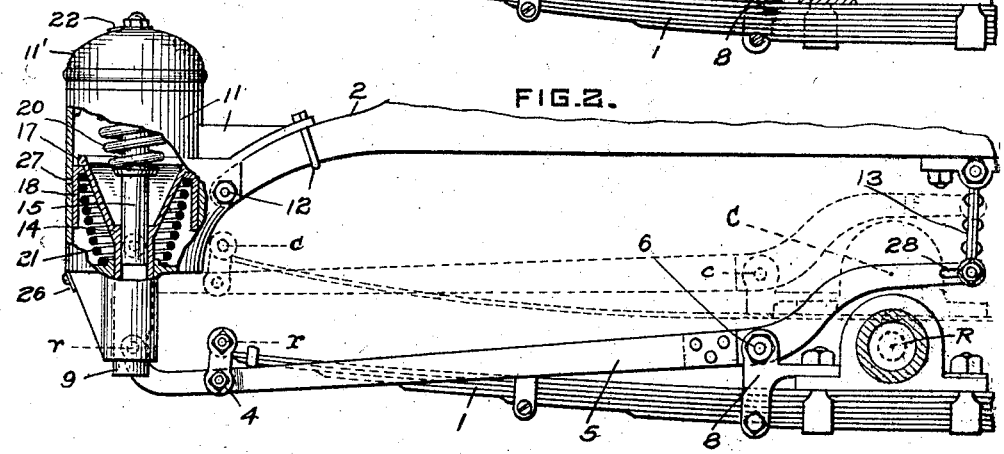
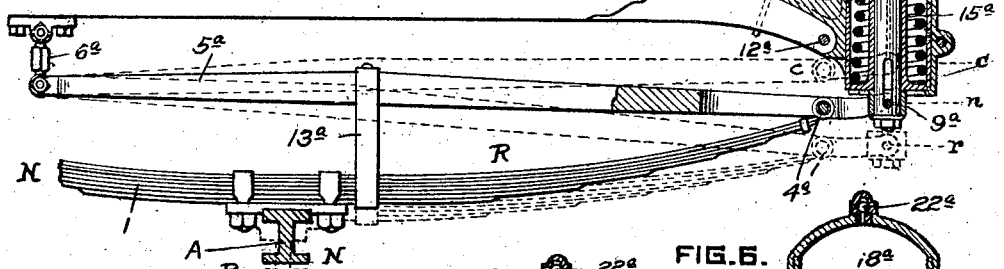
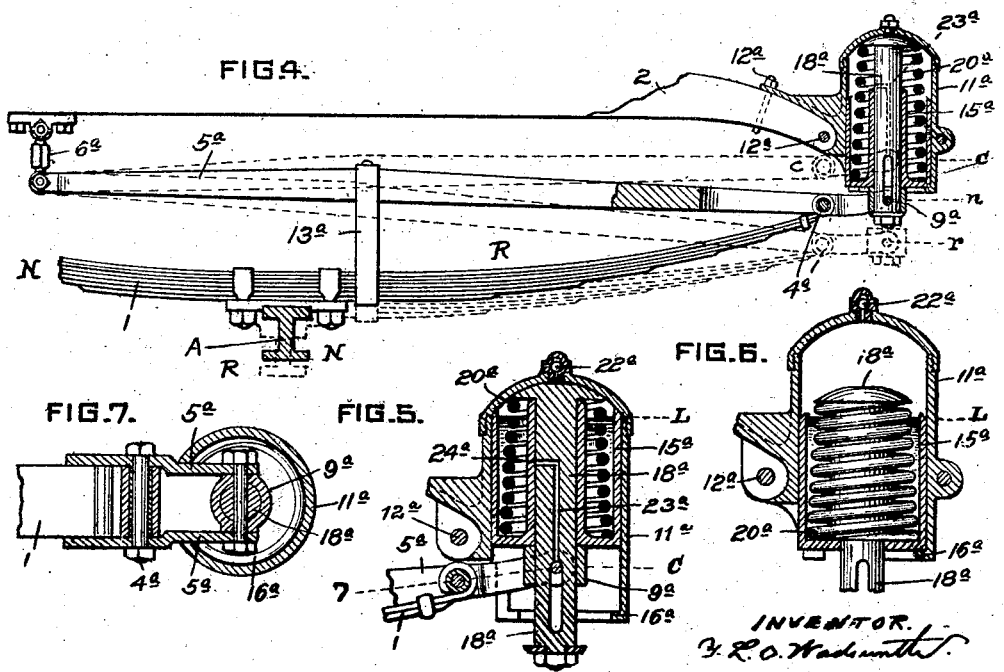
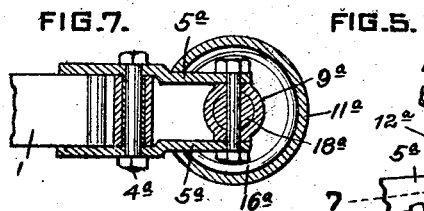
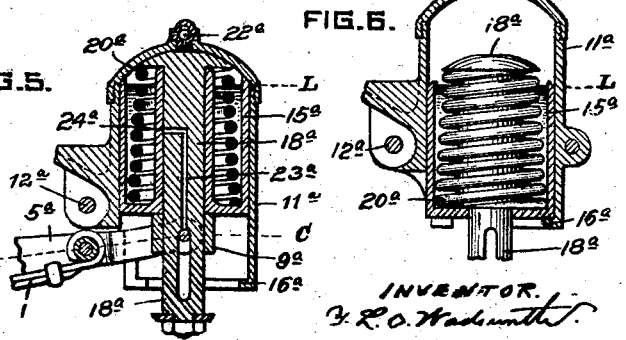
INVENTOR.
F. L. O. Wadsworth

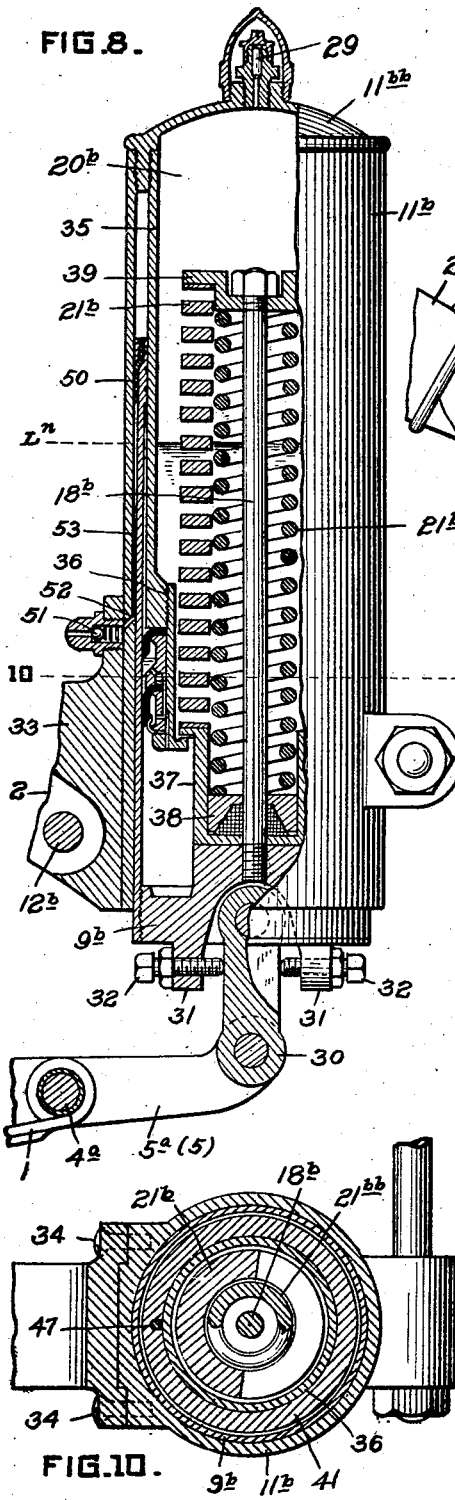
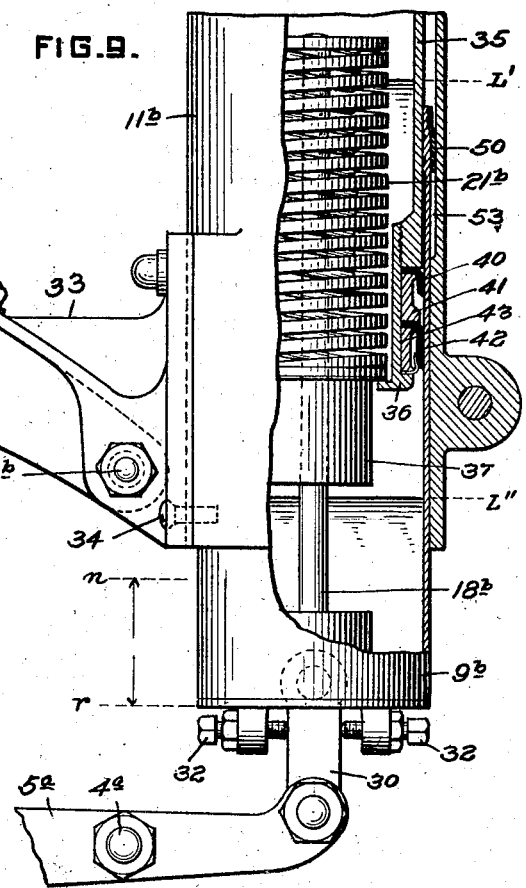
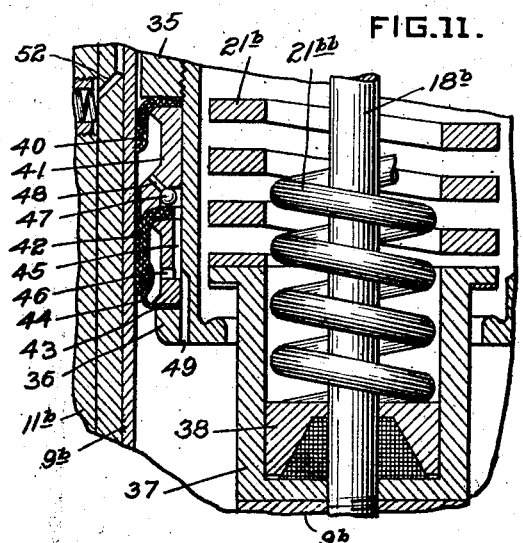

April 12, 1927. 1,624,643
F. L. O. WADSWORTH
ELASTIC SUPPORT SYSTEM FOR VEHICLES
Filed Dec. 16, 1922    4 Sheets-Sheet 3

INVENTOR
F. L. O. Wadsworth

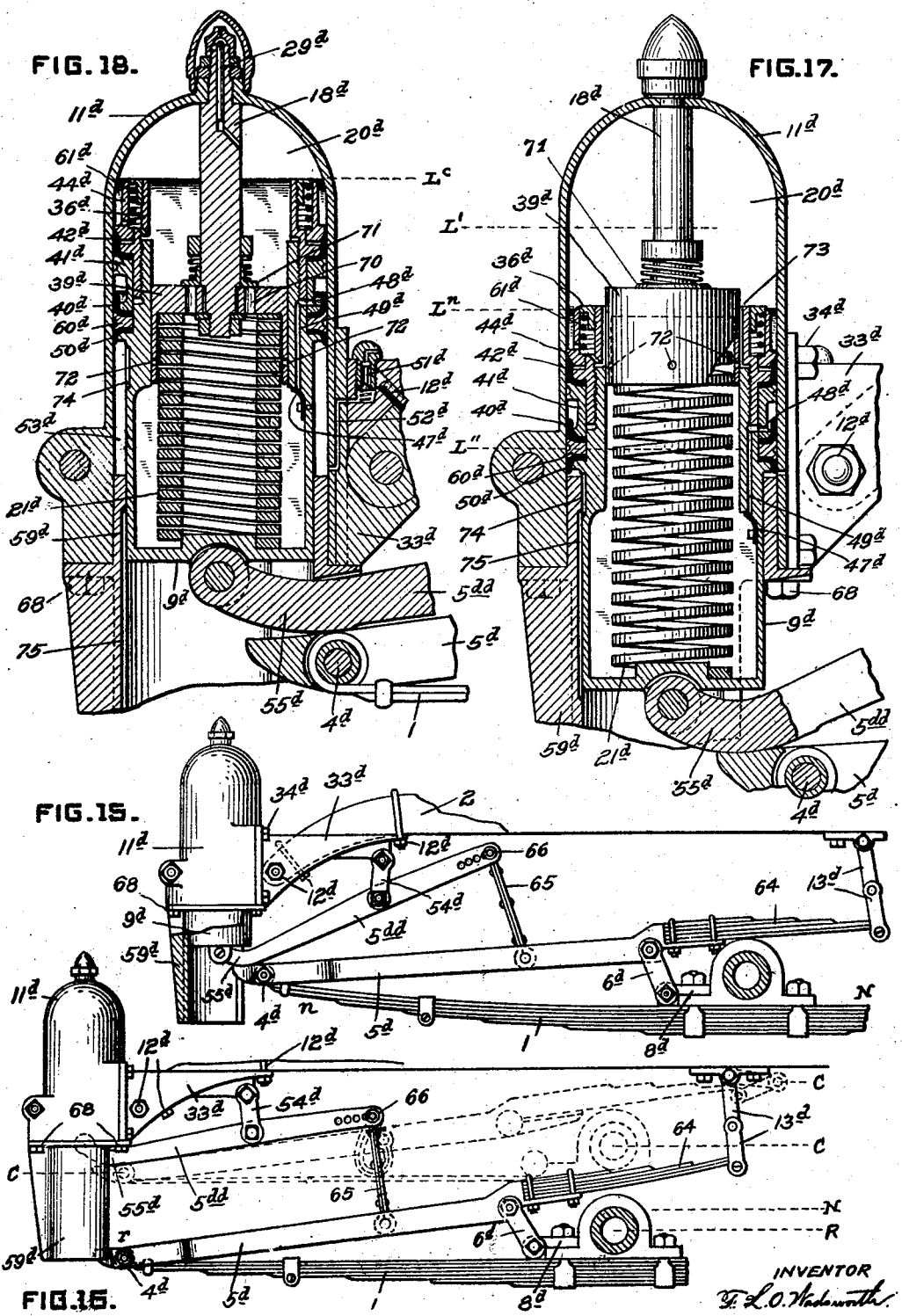

Patented Apr. 12, 1927.

1,624,643

UNITED STATES PATENT OFFICE.

FRANK L. O. WADSWORTH, OF PITTSBURGH, PENNSYLVANIA.

ELASTIC-SUPPORT SYSTEM FOR VEHICLES.

Application filed December 16, 1922. Serial No. 607,308.

My invention relates, in general, to that type of elastic support systems that comprises a plurality of springs which are conjoined in such manner as to resist any displacement from normal load position by joint and progressively increased flexures of all of the said springs; and one of the primary purposes of the present improvements is to provide a system of this character in which two or more of the elastic support elements are operatively connected, and act, in series when the system is subjected to compression stresses, and are differently coupled to act in parallel when an expansion or rebound shock is imposed thereon. Or stated in another way, one of the important features and objects of this invention is the provision of operative means whereby a compression, or kinetic load, shock may be transmitted through, and absorbed by, a plurality of series-connected springs, and whereby an expansion or rebound stress may be communicated to, and restrained by the same springs when coupled in parallel, or multiple relationship.

A further object of the present invention is the provision of a combination of primary and secondary springs which are so connected with each other as to exert an interbalanced series action in restraining and abating the effects of a temporary increase in the load stress on the system, and to exert a more powerful multiple, or parallel, action in quickly arresting any reverse rebound or expansion beyond the position of static equilibrium.

A more particular purpose of these improvements is to provide an auxiliary elastic suspension unit, which may be used in conjunction with the usual forms of main leaf spring supports for vehicle bodies, and which is operatively connected therewith in such manner as to act directly in series with the main spring in opposing the approach of the body and axle members, and to act in parallel with this same spring in resisting and checking the abnormal separation of the elastically supported parts.

Another specific object of the present invention is to provide an improved form of supplemental spring suspension element which presents an elastic resistance to any movement of the spring supported parts away from the position of static equilibrium—i. e., to either compression or rebound displacements—and which is damped or restrained in its subsequent recoil or return movements to said normal position.

Other special features and advantages of the herein described invention will be made apparent, to those skilled in this art, by the accompanying explanation of certain illustrative embodiments thereof that are shown in the drawings, in which:

Fig. 1 is a sectional elevation, on the longitudinal central plane, of one exemplification of my improved suspension system as applied to the rear axle support of a motor vehicle: Fig. 2 is a side view—partially in section on the same plane as Fig. 1—of this same construction with the parts thereof in the position of rebound or expansion; Fig 3 is a sectional plan view on the plane 3—$n$ of Fig. 1; Fig. 4 is an elevation—in partial section on its central plane—of a second embodiment of my invention as it may be used in conjunction with the front axle mounting of an automobile; Fig. 5 is an enlarged sectional view of the supplemental spring member of this second organization with the parts thereof in the position of extreme compression; Fig. 6 is a similar view of this same member and shows the parts in the position which they assume under a rebound or expansion shock; Fig. 7 is a sectional plan view on the bent plane 7—C of Fig. 5; Fig. 8 is a partially sectioned elevation of one of my improved forms of air spring construction that may be substituted for either one of the corresponding members that are illustrated in Figs. 1 and 2, or Figs. 4–5 and 6; Fig 9 is another view of this third form of supplemental spring construction with the parts expanded under the action of rebound stress; Fig. 10 is a cross-section on the plane 10—10 of Fig. 8; and Fig. 11 is a detail sectional view—on a still larger scale—of a portion of the mechanism shown in Fig. 8.

Figure 14:
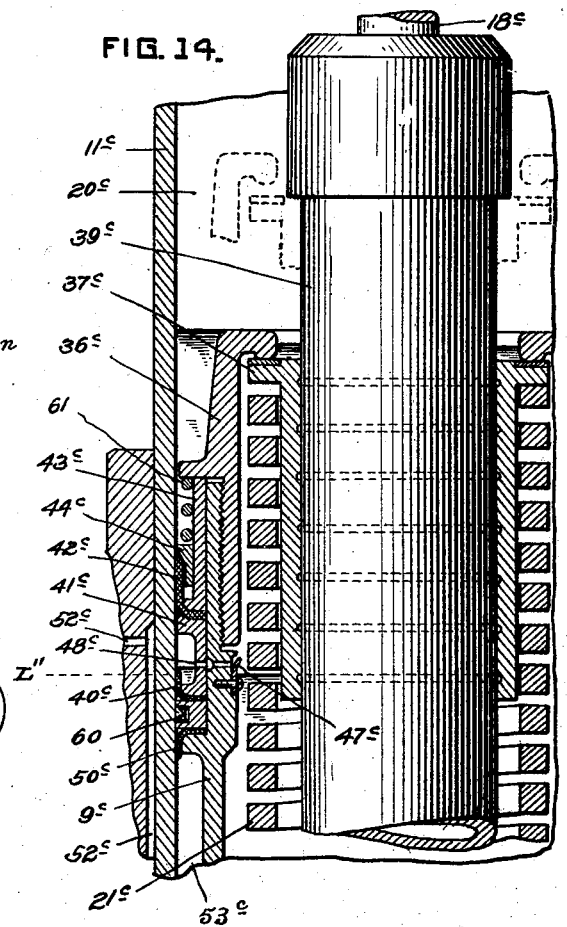
Figure 12:
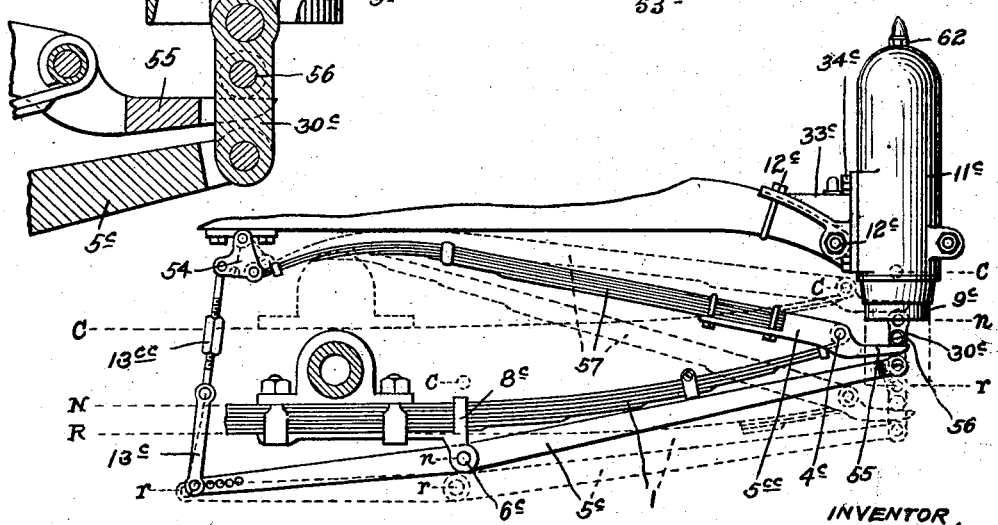

On the third and fourth sheets of my drawings: Fig. 12 is a side elevation of a third complete embodiment of the present improvements; Fig. 13 is an enlarged sectional elevation of the supplemental spring member of that combination; Fig. 14 is another view—on a still larger scale—of a portion of the construction shown in Fig. 13, with the parts thereof in a partially expanded position; Figs 15 and 16 are side views of a fourth exemplification of my invention, and respectively illustrate the main suspension elements in the positions of normal load (or static equilibrium), and of extreme rebound (full lines) and extreme compression (dotted lines); Fig. 17 is a partially sectioned elevation of the supplemental spring elements of the last mentioned combination (with the parts in the normal load position of Fig. 15); and Fig. 18 is a vertical section of these elements in the position shown in Fig. 16.

In the following description of these various illustrative organizations, the same key numbers are used, as far as possible, to designate corresponding or equivalent parts of the several embodiments; although in some cases different numerals may be employed, for the sake of convenience, to indicate functionally analogous elements of different structural combinations.

In the first exemplification of my improvements (Figs. 1, 2 and 3) the main leaf spring 1 is pinned at its inner end to the body of the vehicle and is bolted at its center to the rear axle block, in the usual manner; but the outer end of this primary suspension member is detached from the rear horn of the chassis frame and is flexibly connected—as by the shackle links 4, 4—to the adjacent portion of a lever support 5 that is pivotally mounted, at 6, on the axle block bracket 8. The outer extremity of the lever 5 is pinned, or otherwise flexibly coupled, to the lower end of a plunger 9 which slides vertically in a casing member 11 that is rigidly attached to the body horn 2 by the bolts 12, 12, etc.; and the inner end of the said lever is also flexibly coupled to the body sill by means of the one way strap connection 13. The vertically reciprocable plunger 9 is provided, near its center, with a shoulder 14 which is adapted to engage a central flange on an inner sleeve 15; and the latter is, in turn, connected to the upper cap 11′ of the casing by means of the one way follower bolt 16. The upper part of the plunger 9 is flared outwardly to engage the inner surface of the casing 11, and is provided with a second shoulder 17 that engages with a flanged collar 18 that is limited in its upward movement by the lower end of the casing cap 11′. A volute coil spring 20 is inserted, and held at a predetermined initial tension, between the central flange of the inner sleeve 15 and the cap 11′; and a second spring, 21, of similar form is interposed, and likewise maintained at a normal preadjusted compression, between the collar 18 and the bottom of the casing 11. The cap 11′ is provided with a vent opening, that is closed by an outwardly opening flap valve 22; and the follower bolt 16 has a central duct 23 which is in communication at its lower end, with the outer air—through the open end of the inner sleeve 15 and the adjacent end of the plunger 9—and which terminates, at its upper end, in a lateral port 24 that is located just above the contiguous extremity of the inner sleeve 15. The lower end of the casing is likewise provided with a vent opening that is covered by the downwardly opening valve 26, and the side of the casing is perforated by a port 27 that is positioned just below the edge of the outer sleeve 18 when the latter is in its raised position.

The various parts of this suspension organization are so proportioned and assembled that when the system is subjected to the ordinary or normal load stress the load component on the body horn 2, and the initial tension on the supplemental spring 20, will hold the central flange of the sleeve 15 in light pressure engagement with the head of the suspension bolt 16—as shown in Fig. 1—against the reverse upward thrust of the outer flexed end of the main spring 1 and its conjoined lever and plunger elements 5—9; and in this position of the parts the one way connection 13 is also preferably maintained under a light tension. In order to provide a certain range of adjustment— under varying normal loads—the pivot connection 6 is made up of a central bolt, that passes through the ears of the forked axle bracket 8, and an eccentric bushing 6′ which forms the pivotal bearing for the lever 5, and which can be clamped in any desired angular position, between the said ears, by the nuts on the ends of the said bolt. The pivot connections at the ends of the strap 13 are constructed in a similar manner and the lower one of these connections can also be shifted longitudinally with respect to the lever 5 by providing the inner forked end of the latter with a series of holes or an equivalent slot 28.

When the normally loaded system is subjected to kinetic increases in load—such as will be imposed by the compressive shocks due to the passage of the wheels over irregularities in the road surface, etc.—the body and axle parts will be forced toward each other, and the initial or normal flexure of the series connected springs 1 and 20 will be concurrently and progressively increased to balance and sustain this augmented compression stress. This action will straighten out the bowed leaf spring 1 and will correspondingly rock the lever 5 in a counterclockwise direction on its pivot support 6— thereby relieving the tension in the strap connection 13—and the bodily approach of the spring supported chassis members will move the plunger 9 and the inner sleeve 15 upward with respect to the casing parts 11—11′—thereby compressing the upper supplemental spring 20—without changing the position and initial tension of the sleeve 18 and the lower auxiliary spring 21. The upward movement of the sleeve 15 on the bolt 16 closes the port 24, and the air above the rising plunger 9 is expelled, in part, through the valve 22. In order to reduce the volume of the free space in the top of the casing 11—and thus increase the volumetric contraction and expansion of this space—the flanged cup shaped portion of the plunger 9 may be filled with a heavy viscous oil or grease (e. g., to the level $L^a$) which will also serve to keep all of the reciprocating parts continuously lubricated. When the compression movement has been arrested—by the progressively increased flexural strain in the series-connected elastic suspension units—and the parts begin to move backward toward normal load position, the valve 22 will close; and the recoil of the compressed supplemental spring 20 will be retarded or pneumatically damped by the formation of a partial vacuum above the downwardly moving plunger 9. As this return movement continues the restraint imposed on the recoil or expansion of the spring 20, and its co-moving parts, will be constantly increased both by the progressive reduction in pressure in the top of the casing 11 and by the concurrent reduction in the tension of the expanding coil; and the compressed members may thus be prevented, in many instances, from recoiling or rebounding beyond the normal load position on this return movement. When the conditions of static equilibrium have thus been restored the port 24 will be again opened and the upper end of the casing chamber will be refilled with air at atmosphere pressure.

When the compression movement has been so violent, or of such great amplitude, as to make it impossible to check a rebound or overthrow of the parts beyond normal load position,—or when the suspension system is subjected to an expansion stress by the dropping of the wheels into deep cavities in the road surface, etc.—the one way connection 13 is brought into play to positively rock the lever 5 on its axle support 6; and the resulting accelerated movement of the outer extremity of this rocking member produces an increased positive flexure of the main spring 1; and coincidently imposes an increased compression on the auxiliary rebound spring 21 by reason of the downward movement of the engaged plunger and sleeve elements 9—17—18;—the upper supplemental spring 20 being now held against further expansion by the follower bolt 16. The main spring 1 and the auxiliary spring 21 are thus increasingly flexed in parallel relation; and the combined elastic resistance which they together offer to the abnormal or supernormal separation of the body and axle parts very quickly checks any rebound or expansion movements, regardless of whether they may be retarded or accelerated by gravity action.

During the downward movement of the interengaged plunger and sleeve elements 9—18 the port 27 will be first closed, and the remaining air in the lower end of the casing chamber will be partially expelled through the outwardly opening valve 26. The recoil or return movement of the compressed rebound check spring 21 will then be retarded or pneumatically damped by the closure of the valve 26 and the progressive drop in pressure below the upwardly moving piston parts 9—18. When these parts have been restored to their normal static load positions the port 27 will be again opened, and the lower end of the casing chamber will be refilled with air at atmosphere pressure.

The second exemplification of my present invention (Figs. 4 to 7) is designed for use in conjunction with a front axle support. In such an organization the center of the main side leaf spring 1 is bolted rigidly to the under-slung axle member A and the inner extremity thereof is usually connected to the body sill by a swinging shackle link connection (not shown here). The front or outer end of this primary suspension element is pinned directly to the forward part of a forked, or twin arm, lever support $5^a$; and the opposite extremities of this lever are pivotally connected to the body sill—by means of the adjustable shackle link $6^a$—and to a collar $9^a$ that slides on the lower slotted end of a plunger $18^a$. The intermediate part of the lever $5^a$ is operatively conjoined to the central portion of the main spring 1—adjacent to the axle A—by a flexible loop $13^a$ of leather or other suitable fabric, that is riveted or otherwise secured to the lever, and is loosely engaged with the lower leaf of the main spring. The plunger $18^a$ slides in the elongated central hub of an annular cup shaped piston $15^a$ that is fitted closely in the casing support $11^a$; and the latter is rigidly attached to the front horn 2 by the bolts $12^a$. A supplemental suspension spring $20^a$ is interposed between the head of the plunger $18^a$ and the lower closed end of the piston $15^a$; and the downward movement of this piston is limited by an inwardly turned flange $16^a$ on the casing support $11^a$. The cap of the casing is provided with a vent which is closed by an outwardly opening ball valve $22^a$; and the central plunger is provided with a duct $23^a$ which leads from the slot in the lower end of this member to a lateral port $24^a$, that opens into the casing chamber at a point just above the central hub of the piston $15^a$, when the two reciprocating members, $15^a$ and $18^a$, are in their normal load positions (see Fig. 4).

The mode of operation of this last described construction is as follows: Under the conditions of static equilibrium the parts are in the full line positions shown in Fig. 4, in which the initial tension of the confined supplemental spring $20^a$ is sufficient to carry the normal component of the load stress on the body horn 2 and hold the piston and plunger elements, 15ª and 18ª, in light pressure engagement with the opposite ends of the casing support 11ª; and in which the strap 13ª is also held in light tensioned engagement with the main spring and lever elements 1 and 5ª;—this last specified condition being readily established, after the suspension system is completely assembled, by varying the length of the adjustable turn buckle link 6ª. When, under such conditions, the system is subjected to a kinetic increase of load, (e. g., a compressive shock), the axle and body parts will approach each other; the main spring 1 will be increasingly flexed and straightened out; the lever 5ª will be moved upward with the end of the main spring; and the engaged collar and piston members, 9ª—15ª, will be correspondingly lifted toward the casing supported head of the inner plunger 18ª; thereby compressing the supplemental spring 20ª in series with the main spring 1. The upward movement of the piston hub on the plunger 18ª closes the port 24ª, and the air in the casing chamber is then expelled through the valve 22ª as the upward movement continues. When the compressive shock has been absorbed by the progressively increased elastic resistance of the two series—connected springs 1 and 20ª, the parts will be returned to normal load position N—n, (Fig. 4) by the recoil of the said springs; and this return and recoil movement will be retarded and damped by the formation of a partial vacuum in the expanding space between the casing and piston members, 11ª—15ª. When the position of static equilibrium is reached the port 24ª will be again opened and the casing chamber will be refilled with air at atmospheric pressure.

When the body and axle members are separated beyond normal load position— e. g., by a rebound or overthrow of the elastic suspension elements after they have been subjected to unusually severe compression strains, or by an expansion stress—the strap 13ª will positively rock the lever 5ª in a clockwise direction on its body support 6ª, and the magnified movement of the outer end of this lever will produce an increased flexure in the main spring 1;—as shown by the dotted line R—r of Fig. 4. This movement will be simultaneously communicated to the inner plunger 18ª—through the engagement of the collar 9ª with the nut on the lower end of said plunger—and the spring 20ª will be thus compressed, in parallel with the main spring 1, by the relative approach of the parts 18ª—15ª (as shown in Fig. 6). The initial downward motion of the plunger 9ª, with respect to the central hub of the casing supported piston 15ª, will again close the port 24ª; and the continued motion of the said member will result in a reduction of pressure in the expanding space above the plunger that will assist in resisting and checking the rebound movement of the system. But in this case the return or recoil of the spring connected parts—from the expanded position R—r of Figs. 4 and 6 to the normal load position N—n of Fig. 4—is not subject to any damping restraint, save that imposed by the frictional resistance to the recoil movements; and in this respect the operation differs, in one minor phase, from the operation of the first described organization.

In order to reduce the volume of free air in the top of the casing chamber—and thus accentuate the expansion or "suction" effect produced by the downward movements of either the piston member 15ª or the plunger member 18ª—the cup shaped piston may be filled with a thick oil or a light grease to the level L (Figs. 5 and 6); and the slight splashing of this material over the edges of the receptacle will serve to keep all of the mutually reciprocating parts in well lubricated condition.

Figs. 8 to 11 illustrate an improved form of supplemental air spring construction that may be used in conjunction with either one of the complete suspension systems heretofore described. In this alternate exemplification of this feature of my improvements, the outer end of the lever 5ª (or 5) is slightly modified in form, and is connected to the lower end of a cup shaped plunger 9ᵇ, by means of the shackle link 30. The lower head of the piston 9ᵇ is provided with two lugs 31—31 which carry set screws 32—32 that are adapted to engage the edges of the link 30. When the supplemental spring is used in conjunction with a front axle support (as shown in Fig. 4) the link 30 is clamped rigidly in place between the screws 32—32, and the end of the lever 5ª is thus held in fixed axial relationship to the reciprocating plunger 9ᵇ. In this case the outer eye end of the main spring 1 is pinned directly to an adjacent portion of the lever, by the cross pintle bolt 4ª; and the interconnected parts 1 and 5ª thus act as a radius rod to maintain the front axle in a predetermined position with respect to the plunger support 9ᵇ. If it is desired to use the supplemental spring as a part of a rear axle suspension system—such as is shown in Fig. 1—the screws 32—32 may be withdrawn so as to permit of a relative longitudinal movement of the main spring and lever elements (1 and 5) with respect to the axis of reciprocation of the plunger.

The plunger 9ᵇ slides vertically in a casing 11ᵇ which is rigidly attached to the body horn 2 by means of the bracket 33 and the bolts and screws 12ᵇ—34, etc. The upper end of this casing is closed by a cap 11ᵇᵇ to which is attached an inner casing sleeve 35 that is also closely engaged by the upper end of the plunger 9$^b$. The lower extremity of the sleeve 35 is enlarged to receive an annular flanged head 36; and the inwardly turned shoulder on this head engages with an inner cup shaped plunger, 37, that is seated on a central boss at the lower end of the outer plunger 9$^b$. This boss carries a follower bolt 18$^b$ that extends up through a metallic packing gland 38 in the member 37 and is provided at its upper end with an adjustable head 39. A coil compression spring 21$^b$ is confined, at a predetermined initial tension, between the head 39 and the rim of the inner plunger 37; and a second coil spring 21$^{bb}$ is interposed between the said head and the end of the gland 38. A series of cup washers and spacing rings 40—41—42 and 43 are clamped between the enlarged lower end of the sleeve 35 and the flanged head 36; and the lower one of the washers (42) is provided with an expander ring 44 that is cemented at its upper edge to the said washer and is held at its lower edge between the ring 43 and the head 36. The lower ring 43 is provided on one side with a groove 45 that extends from its upper edge to a point near its center, and with a port 46 that connects the lower end of this groove with the space between the rings 43—44 and the washer 42. The upper ring 41 is also provided on one side with a recess or pocket which is in registry with the upper end of the groove 45 and which contains an inwardly opening ball valve 47; and it has a port 48 that leads from the seat of this valve to the outer recessed face of the ring. The lower portion of the head 35 is also provided with a duct 49 that is in registry with the groove 45 and the port 46 of the lower ring 43. The upper end of the plunger 9$^b$ is provided with a leather piston washer 50 that is securely wired to the upper grooved or corrugated edge of the said plunger; and the assembled casing members 11$^b$—33 are provided with an inwardly opening valve 51, and a port 52 that leads to the lower end of the annular chamber 53 in which the end of the outer plunger 9$^b$, and its attached piston washer 50, reciprocate.

In the use of this supplemental spring structure the reservoir or chamber between the plunger 9$^b$ and the casing sleeve 35 are partially filled with oil—e. g., to the normal level L$^n$ of Fig. 8—and the compressed air is then introduced through a suitable valve 29 in the casing cap, until the pressure of the said air in the upper part of this chamber (20$^b$), is sufficient to carry the normal load component on the body horn 2 and maintain the inner plunger 37 in light pressure engagement with the flanged head 36.

When the system is subjected to a kinetic increase in load the outer plunger 9$^b$ is lifted relatively to the casing 11$^b$ (carrying with it the members 37—38—18$^b$—39—21$^b$ and 21$^{bb}$) and an opening is formed between the parts 36—37 (as shown in Fig. 11) through which the oil in the lower part of the air spring can pass freely to the upper compartment thereof. In this phase of the operation the oil below the head 36 is subjected to the full pressure of the confined fluid in the upper chamber 20$^b$; and this pressure is transmitted, through the communicating ducts 49—46, to the inner face of the packing washer 42, and serves to force that member into close sealing engagement with the inner wall of the plunger 11$^b$. The pressure in the duct 45 also closes the ball valve 47 and prevents any escape of oil through the port 48. The continued approach movement of the plunger and casing members, 9$^b$—11$^b$, progressively decreases the volume, and increases the pressure, of the confined air, and thus produces a constantly increasing supplemental spring resistance that acts in series with the concurrently flexed main spring 1 in absorbing and checking the compressive shock. The upward movement of the plunger 9$^b$, relatively to the double walled casing 11$^b$—35, will compress the air that is confined in the annular chamber above the piston 50; and this same movement will also slightly expand the air that is trapped between the upper head of the outer plunger and the washer 40 on the inner casing sleeve 35. Both of these actions will supplement the compression of the fluid in the main air spring chamber in resisting the relative approach of the body and axle parts. The annular space 53 below the upwardly moving piston 50 is kept filled with air at atmospheric pressure by the opening of the check valve 51; and when the return movement begins, the recoil of the compressed air spring is moderated by the closing of this valve and the subsequent compression of the air that is thus trapped in this outer chamber.

When the compression is very severe and the following recoil of the compressed spring units is so violent as to carry the parts beyond normal load position (or when the system is otherwise subjected to expansion stresses) the separation of the plunger and casing members 9$^b$—11$^{bb}$—35 will move the head 39 toward the engaged parts 36—37—38, and will thereby compress the auxiliary coil springs 21$^b$, 21$^{bb}$. The reengagement of the head and flanged cup elements 36—37 cuts off communication between the bottom part of the air spring chamber, and the upper part thereof (20$^b$); and the continued downward movement of the plunger relative to the casing lowers the level of the oil in this lower compartment (e. g., to the level L″ of Fig. 9) and creates a partial vacuum under the head 36, which supplements the action of the auxiliary springs $21^b$—$21^{bb}$ in quickly abating and arresting the rebound or supernormal expansion of the suspension system. This reduction of pressure in the lower part of the plunger chamber also relieves the expanding pressure on the cup washer 42, and permits the valve 47 to open; and any oil that has leaked past either of these parts, into the annular chamber between the ring 41 and the washer 40, will now flow back into the expanding space below the head 36.

The rebound or expansion movement of the relatively reciprocable parts $9^b$ and $11^b$ (beyond normal load position) will further compress the air that was initially compressed in the space 53 (by the return of the members from the position of compression); and will also result in some compression of the air in the annular space above the packing washer 40; and these effects will further supplement the cooperative actions of the springs $21^b$ and $21^{bb}$, and of the "vacuum check" above described. All of these progressively increased elastic resistances to rebound act in parallel, or, in multiple, with the simultaneously increased flexural strain that is imposed on the main spring by the forced angular movement of the lever support $5^a$ (or 5), when the above described supplemental spring construction is used as a part of the complete combinations shown in Figs. 1 to 7.

The air which is compressed in the chamber 53 will be prevented from passing into the chamber above the outer plunger $9^b$—and thence into the space between that plunger and the parts 35—40—41, etc.—by the close engagement between the plunger and washer members $9^b$—50 and the walls of the casing sleeves $11^b$—35; and the "pumping" of outside air into the lower compartment of the air spring (during rebound movements) in thus avoided. But a part of the air thus compressed will escape through the bearing between the plunger $9^b$ and the lower part of the casing $11^b$; and this escape—which can be regulated in amount by the bearing clearance between these parts—assists in expelling or excluding dust and dirt from this sliding joint. The drop in pressure that results from this escape will diminish the aggregate of the elastic forces that tend to restore the expanded parts to normal load position. If the rebound movement is of large amplitude there will also be some leakage of fluid from the upper compartment of the air spring chamber into the lower vacuum compartment—through the contact joint between the parts 36 and 37—that will further diminish the suction effect on the plunger $9^b$ and correspondingly reduce that component of reactive stress, on the expanded parts. The potential forces tending to return the members from the rebound positions R—$r$ to the normal load position N—$n$ are therefore of less magnitude than those developed during the displacement movement itself; and the recoil of the elastically strained suspension units is retarded or slowed down to a degree that can be partially controlled by the tightness of the joints between the members $9^b$—$11^b$ and 36—37.

Fig. 12 depicts a third suspension system—here shown as applied to a rear axle assemblage—which further exemplifies my generic improvements. In this organization two lever supports are used to operatively connect the main and the supplemental spring units of the system. One of these lever elements—here indicated by the reference character $5^c$—is pivotally mounted, at $6^c$, on an axle bracket $8^c$; and is coupled at its opposite ends to the supplemental spring plunger $9^c$ (by means of the shackle link $30^c$) and to the body of the vehicle (by the collapsible link-turnbuckle connections $13^c$—$13^{cc}$, and the swinging frame 54). The second lever $5^{cc}$ is pinned, near its outer end, to the adjacent eye of the main spring 1 (by the pintle bolt $4^c$), and is provided with a forked extension 55 which closely embraces the sides of the link $30^c$ and engages with friction rollers 56, 56, that are rotatably mounted thereon. The rearwardly extending portion of this lever may be made in the form of a transversely rigid bar (e. g., like that illustrated in Fig. 4); but, as here shown, it consists of a flexible leaf spring 57 that is coupled at its eye end to the swinging frame 54. The plunger $9^c$ is reciprocably mounted in a casing $11^c$ which is attached to the body horn 2 by means of the bracket support $33^c$ and the bolts $12^c$—$34^c$ etc. The movement of the plunger in the casing is resisted by two counteracting spring elements which may be of the same general form and character as those illustrated in either Figs. 1 and 2, or Figs. 8 and 9.

The mode of operation of the system last considered is generically the same as that which characterizes the previously described embodiments of my invention. In the normal load position—as shown in full lines N—$n$ of Fig. 12—the one way connection $13^c$—$13^{cc}$ is under a slight tension; and the normal flexural strain on the outer end of the main spring 1 is transmitted in series to the compression-resisting-supplemental-spring element through the lever-link and plunger members $5^{cc}$—55—56—$30^c$—$9^c$. When the load is kinetically increased the approach of the body and axle members is resisted by the concurrently increased and superimposed flexures of these series-connected springs, and also by a slightly increased bending of the lever spring arm 57. When the system is subjected to a rebound or expansion shock the lever $5^c$ is rocked in a clockwise direction on its axle support 6ᶜ (by the action of the one-way connections 13ᶜ—13ᶜᶜ) and the magnified movement of its outer end is communicated, in parallel, to the rebound check auxiliary spring (which resists the downward movement of the plunger 9ᶜ) and to the outer end of the main spring (through the connections 30ᶜ—56—55—4ᶜ).

Figs. 13 and 14 depict a second form of my improved pneumatic-coil-spring construction that may be used as the supplemental-auxiliary suspension unit of the combination shown in Figs. 1 and 2; but which is here illustrated as a part of the organization shown in Fig. 12. In this construction the lower portion of the cup shaped plunger 9ᶜ is laterally supported and guided by a removable bushing 59 that screws into the bottom of the casing 11ᶜ; and the upper end of the said plunger is provided with a series of cup washers and spacing rings 50ᶜ, 60, 40ᶜ, 41ᶜ, 42ᶜ and 43ᶜ, that are clamped thereon by the annular collar 36ᶜ. Each one of the flared washers 50ᶜ, 40ᶜ, and 42ᶜ is so shaped and held as to make close sliding engagement with the inner wall of the casing 11ᶜ; and the free edge of the upper washer 42ᶜ is pressed tightly against its bearing surface by the beveled expander ring 44ᶜ and the coil spring 61. The spacing ring 41ᶜ is provided on one side with a port 48ᶜ, which is in registry with a corresponding opening in the wall of the plunger 9ᶜ; and the inner end of this opening is covered by a check valve 47ᶜ. The upper extremity of the collar 36ᶜ has in inwardly turned flange which is adapted to engage the head of an inner plunger or sleeve 37ᶜ that is slidably mounted on a hollow cylinder 39ᶜ; and the latter is, in turn, engaged by the piston head of a follower bolt 18ᶜ that is secured to the cap of the casing 11ᶜ by the nut 62. A powerful coil spring 21ᶜ is interposed between the flanged head of the sleeve 37ᶜ and the cap 63 on the lower end of the cylinder 39ᶜ; and the latter is preferably spaced a slight distance above the adjacent closed end of the plunger 9ᶜ when the latter is in its normal load position. The bracket 33ᶜ carries a cap which contains an inwardly opening valve 51ᶜ; and passage ways 52ᶜ lead from the inner side of this valve, through the bracket 33ᶜ and the wall of the casing 11ᶜ, to the lower end of the annular chamber 53ᶜ between the parts, 9ᶜ—11ᶜ—50ᶜ and 59.

The enclosed chamber between the cup shaped plunger 9ᶜ and the casing 11ᶜ is partially filled with viscous oil to a level somewhat above the contact joint between the parts 36ᶜ—39ᶜ (e. g., to the level Lⁿ) and the lower part of the hollow cylinder 39ᶜ is also preferably filled with grease or paraffin. The upper part 20ᶜ of the closed chamber is then charged with a compressed air (through a suitable valve 29ᶜ that is carried in the upper end of the bolt 18ᶜ) at such pressure as will suffice to maintain the parts in the positions shown in Figs. 12 and 13 when the suspension system is subjected to normal load. When the load stress is increased the casing 11ᶜ moves downwardly with respect to the plunger 9ᶜ (or vice versa); and this movement breaks the contact between the members 36ᶜ—37ᶜ (as shown in the dotted lines of Fig. 14) thus establishing an open communication between the upper and lower compartments of the air spring. The initial approach of the plunger and casing members brings the plunger 9ᶜ into engagement with the lower cap 63 of the cylinder 39ᶜ, and thus moves the latter upwardly with respect to the head of the bolt 18ᶜ. The air which is confined in the compartment 20ᶜ, and the air which is in the upper end of the cylinder 39ᶜ, is thus coincidently compressed by the continued relative approach of the parts; and the resultant progressive increase in the pneumatic resistance to such approach movements acts, in series with the concurrent increased flexure of the main spring 1, to absorb and restrain the effects of compressive shocks. During this phase of the operation the annular chamber 53ᶜ, between the end of the bushing 59 and the packing washer 50ᶜ, is enlarged, and is kept filled with air at atmospheric pressure through the inwardly opening valve 51ᶜ. When the approach, or compression displacement, is checked and the parts begin to return toward normal load position, the valve 51ᶜ closes and the air which is trapped in the chamber 53ᶜ is compressed by this reverse movement; and a pneumatic check, or damping action, is thus imposed on the free recoil of the air spring elements.

When the system, now under consideration, is subject to rebound, or to an expansion stress, the plunger assembly, 9ᶜ—36ᶜ, etc., will be drawn downwardly, with respect to the casing supports 11ᶜ—33ᶜ, etc., (in the manner previously described); and this movement produces a further compression of the trapped air in the now contracting chamber between the parts 50ᶜ—59. This separation of the parts 9ᶜ and 11ᶜ also results in the relative approach of the inner plunger 37ᶜ (which is carried downward with the interengaged parts 9ᶜ—36ᶜ) and the lower head 63, of the cylinder 39ᶜ (which is carried upward with the connected members 11ᶜ—18ᶜ) and produces a correspondingly increased compression of the rebound check spring 21ᶜ. The withdrawal of the cylinder 39ᶜ from the lower compartment of the air spring chamber (below the sealed engagement of the cap 36ᶜ and the sleeve 37ᶜ) also produces a progressively increased "vacuum" therein—with an accompanying fall of the oil level (e. g., to a point L″ Fig. 14)—which supplements the effect of the positive compression of the rebound check spring $21^c$ and of the trapped air in the chamber $53^c$, in restraining and quickly checking the separation of the body and axle members of the suspension system; and these conjointly acting supplemental spring restraints all act in parallel, i. e., in multiple relation, with the increased flexure of the main spring 1, in thus absorbing and abating the objectionable effects of rebound or expansion stresses.

The above described drop in pressure, and in the oil level, in the lower chamber, permits the valve $47^c$ to open, and permit any liquid which has leaked past the packing ring $42^c$ to flow back into this lower chamber; and when the joint between the parts $36^c$—$37^c$ is again broken—on the initiation of another compression movement—the oil in both lower and upper chambers once more becomes a single continuous mass. The air which is compressed in the outer annular chamber $53^c$, is prevented from passing into the recess between the oil packing rings $40^c$—$42^c$ by the reversely turned washer $50^c$ and the tightly fitting piston ring 60; but a portion of this compressed air will be forced out through the sliding joint between the plunger $9^c$ and the bushing 59 and will thus serve to keep this bearing free from dust and mud.

Figs. 15 and 16 illustrate a second double-lever-series-parallel-spring combination, which presents the same generic features of operation that characterize the preceding embodiments of my invention, but which differs from the other illustrative exemplifications thereof in being so designed that the supplemental suspension units act as a "one way" spring, which is always compressed in the same direction from normal load position. In this form of construction the outer end of the main spring 1 is pivotally connected to the adjacent extremity of a rigid lever $5^d$ (by means of the cross bolt $4^d$) and the intermediate portion of this lever is coupled to the axle block $8^d$ by the swinging shackle links $6^d$. The outer end of the lever $5^d$ is made in the form of a slightly concaved rocker block that is normally engaged with the curved rocker end $55^d$ of a second lever $5^{dd}$; and this part of the second lever is pivotally attached to the lower end of the supplemental spring plunger $9^d$, which is reciprocably mounted in a casing $11^d$ and an extension bushing $59^d$ bolted thereto. The casing $11^d$ is rigidly secured to the body horn 2 by means of the bracket $33^d$ and the bolts $12^d$, $34^d$, etc.; and the intermediate portion of the lever $5^{dd}$ is also flexibly connected to this bracket by means of the shackle links $54^d$. The inner portion of the first lever $5^d$ is preferably made in the form of a stiff leaf spring 64, which is connected, at its eye end, to the body of the vehicle by the collapsible links $13^d$; and the inner end of the second lever $5^{dd}$ is flexibly coupled to the outer intermediate part of the first lever by the "one way" adjustable strap connection 65. A supplemental spring—of any suitable form—is interposed between the relatively reciprocable plunger and casing members $9^c$—$11^c$.

The specific mode of action of this last described organization is as follows: In normal or static load position, the outer end of the main spring is operatively connected in series with the supplemental spring—by the elements $4^d$—$55^d$—$9^d$, etc.—and the parts are so adjusted that the "one way" connections $13^d$ and 65 are both under slight tension. When the system is subjected to kinetic compression stresses the outer engaged ends of the two levers $5^d$, $5^{dd}$ move as a unit toward the body casing $11^d$; and the initial flexures of the series-connected main and supplemental springs are both progressively increased as this movement continues. In this phase of the operation the various spring and lever elements move from the full line positions N—n of Fig. 15 toward the dotted line positions C—c—c of Fig. 16—the ultimate position assumed by the lever $5^{dd}$ being the same as that shown in full lines in this figure. But when the body and axle parts are separated beyond normal load position—under the effect of a rebound or expansion stress—the links $13^d$ rock the lever $5^d$ in a counter-clockwise direction on its axle support, $6^d$—$8^d$; and the magnified movement of the outer extremity of this lever flattens or straightens out the main spring 1; while the pull of the tensioned strap 65 rocks the lever $5^{dd}$ in the opposite, or clockwise direction on the body support $54^d$—$33^d$, and thus simultaneously increases the initial compression of the supplemental spring in its casing support $11^d$. But in this phase of action the main and supplemental springs do not cooperate in series, but are coincidently flexed in multiple relationship; and the elastic restraint imposed on rebound movements is correspondingly greater than that imposed on equal (linear) movements of compression. In this case the ratio between the increased flexures of the main and supplemental springs—when they thus act in parallel—may be varied by shifting the position of the bolt connection 66 (between the strap 65 and the lever $5^{dd}$); and in this respect the suspension organization of Figs. 15 and 16 presents one detail feature of adjustment that is not present in the organizations of Figs. 1, 2, 4, or 12.

As previously stated any suitable form of "one way" spring may be used as the supplemental suspension element of the last considered organization. The form which I have here shown as suitable for this purpose is illustrated in greater detail in Figs. 17 and 18. This form comprises a combination of air spring and coil spring elements— (which I have designated as a semi-pneumatic spring)—which act in parallel to elastically resist and check any movement of the plunger and casing parts $9^d$—$11^d$ toward each other; and of auxiliary pneumatic damping means which retard and restrain the recoil or expansion movements of the said parts toward normal load position. More specifically described the construction consists of the body supported casing $11^d$, and the extension bushing $59^d$ which is fitted closely into the lower end of the casing and is secured thereto by the bolts 68; the cup shaped plunger $9^d$, which is provided at its upper edge with the cup washers and spacing rings $50^d$, $60^d$, $40^d$, $41^d$, $42^d$ that are clamped in place thereon by the flanged sleeve $36^d$; an inner plunger $39^d$, which is closely fitted to the interior periphery of the outer plunger $9^d$ and is held in fixed longitudinal relationship to the casing $11^d$ by the bolt $18^d$; and a powerful coil compression spring $21^d$ which is interposed between the inner and outer plungers, $39^d$ and $9^d$. The member $39^d$ is provided with a series of axial ports 70—70 which are closed at the top by the upwardly opening check valve 71; and with a row of radial ports 72, which are so positioned that when the parts are in normal load position (Figs. 15 and 17) these ports open into the annular space 73, between the inner plunger $39^d$ and the clamp sleeve $36^d$. The ring $41^d$ is also provided with a radial port $48^d$ that is in registry, at its inner end, with a longitudinal duct $49^d$ in the plunger $9^d$; and this duct $49^d$ is closed at its lower end by an inwardly opening flap valve $47^d$. The annular space $53^d$—between the cup washer $50^d$ the bushing $59^d$ the plunger $9^d$ and the casing $11^d$—is in communication with the outside air through the inwardly opening valve $51^d$ and the passageway $52^d$; and the plunger $9^d$ is also provided with a short groove 74 that is normally in registry with a longitudinal passage way 75 on the inner bearing face of the bushing $59^d$.

In the use of this semi-pneumatic supplemental spring the interior chamber is preferably filled with oil or grease to about the level $L^n$ (Fig. 17), and compressed air is then introduced, through the valve $29^d$, until the pressure in the upper space $20^d$ is sufficient to balance the difference between the normal component of load stress on the body parts 2—$11^d$—$18^d$—$39^d$ and the initial tension of the coil spring $21^d$, and to thereby maintain the relatively reciprocable members $9^d$ and $11^d$ in static equilibrium when they are in the expanded position of Figs. 15 and 17. In this position the ports 72 are open and the oil below the piston $39^d$ is therefore subjected to the full pressure of the fluid above that level. When the system is subjected to either a compressive or an expansive stress—i. e., when the body and axle parts move in either direction from normal load position—the plunger $9^d$ is moved upwardly with respect to the casing $11^d$ (as shown in Figs. 16 and 18) and the initial compressions of both the confined fluid and of the coil spring $21^d$ are simultaneously increased. The initial phase of this compression movement closes the ports 72, and thus shuts off communication between the upper and lower compartments of fluid pressure chamber; but as the movement continues the spring pressed valve 71 rises and permits the oil to pass freely from the space below the piston $39^d$ to the space above it. The approach movement of the members $9^d$ and $11^d$ also expands the annular space $53^d$ and the latter is kept filled with air at atmospheric pressure by the opening of the valve $51^d$.

When the compression or rebound movement of the system as a whole has been arrested (either by the series or parallel compression of the main and supplemental springs 1, $20^d$, $21^d$) the recoil or return of the suspension elements to normal load position—which involves the movement of the plunger $9^d$ away from the parts $11^d$—$18^d$—$39^d$—is restrained and retarded by the closing of the valve 71 and the formation of a gradually increasing "vacuum" (or a progressively decreased pressure) in the expanding space below the piston $39^d$. This "suction damping" action is supplemented by the closing of the valve $51^d$ and the progressive compression of the air trapped in the annular space $53^d$. These two cooperative check actions on the recoil movements progressively increase in magnitude as the parts approach normal load position; but when that position is reached, or nearly reached, both restraints are removed;—the one by the opening of the ports 72 and the reestablishment of free communication between the lower and upper compartments of the air spring chamber, and the other by the registry of the port 74 with the groove 75 and the consequent discharge of the compressed air from the annular chamber $53^d$.

During the return movement—from the position shown in Fig. 18 toward the normal load position shown in Fig. 17—the oil which is above the piston $39^d$ is prevented from returning to the lower compartment of the air spring, and the level of the liquid therein will drop below that in the groove between the bearing washers, $40^d$—$41^d$—$42^d$. This drop in level—and the accompanying decrease in pressure in the lower chamber—will permit any fluid which may have leaked past the ring $42^d$, to pass back, through the inwardly opening valve 47$^d$, to the expanding space beneath the piston head 39$^d$; but when normal load position is reached, and the ports 72 are again opened, the valve 47$^d$ is immediately closed by the refilling of the lower compartment with oil and the immediate reestablishment of the normal air spring pressure therein. But any "pumping" of outside air into the groove in the ring 41$^d$—and thence into the lower compartment of the air spring—will be prevented, as before, by the action of the packing rings 50$^d$—60$^d$ which cut off any inward flow of fluid from the outer chamber 53$^d$.

It will now be obvious, to those skilled in this art, that all of the complete suspension organizations hereinbefore described present the same general combination of parts;—viz., a main spring rigidly secured to the axle of the vehicle, a supplemental spring mounted on the body of the vehicle, and an intervening system of connections conjoining contiguous ends of the said springs with the said axle and body parts in such manner that the elastic elements act in series when subjected to an increase in load stress, and act in parallel or in multiple when subjected to rebound or expansion stresses—this action producing in each case an augmented elastic resistance of both springs to the accompanying displacements from normal load position. It will further be apparent that all of the supplemental spring units herein shown or described as part of the aforesaid organizations are of the dual resistance type—i. e., they all present a progressively increasing elastic resistance to any displacement or departure of the body and axle members from the position of static equilibrium—that resistance being afforded either by a single double-acting spring (as shown in Figs. 4-5-6 and 17-18) or by a pair of reversed or counter-acting springs (as in Figs. 1-2, 8-9 and 13-14).

It will also be clear that the several forms of pneumatic or semi-pneumatic auxiliary springs, which are illustrated in Figs. 8 to 11, 13-14 and 17-18, as constituting part of my entire invention, have certain general characteristics of structure and operation;—e. g., they all present a combination of pneumatic and metal-coil springs that are adapted to restrain, either successively or coincidently, any displacement of the parts from normal load position; they all include, as part of the combination, some means for pneumatically damping the recoil of one or both of these springs after they have been subjected to an increased, or displacement, strain; they all have an internal piston or plunger which is adapted to divide the air spring chamber into two compartments that are successively connected and disconnected with each other as the relatively movable parts oscillate in opposite directions; they are all provided with means for permitting any fluid, which may leak from the air spring chamber, to be intermittently returned to one of the compartments thereof without the use of any pump or other auxiliary mechanism such as is ordinarily employed for that purpose; and they are all further provided with supplemental guards for preventing any "pumping" or forcing of outside air into the interior of the air spring during the operation of the mechanism.

It has already been pointed out that the several elements of the various suspension organizations hereinbefore described may be used alternatively or interchangeably in many generically analogous combinations; and, with the preceding disclosure as a guide, those familiar with the design and use of such organizations, will be enabled to utilize my present improvements—in whole or in part as may be desired—in numerous other shock absorber constructions, and in conjunction with other forms of main spring and chassis frame mountings that are not herein specifically illustrated. I do not, therefore, limit the scope of my invention by the particular examples which I have given of its application.

What I claim is:

1. In an elastic support system for relatively movable members the combination of a plurality of springs interposed therebetween, and means conjoining said members and said springs whereby the latter are connected in series when the members are forced toward each other, and are connected and increasingly flexed in parallel when the members are separated beyond the position of static equilibrium.

2. In an elastic support system for vehicle bodies the combination of a main leaf spring, a supplemental spring, and connective means conjoining said springs with the body and axle members of the vehicle, and acting to progressively increase the superimposed or series-induced flexure of both springs when the system is subjected to compressive shocks, and also acting to coincidently increase the separate or parallel-imposed flexures of the same springs when the system is subjected to rebound or expansion stresses.

3. In an elastic support system for a vehicle chassis the combination of a main spring rigidly attached to one of the chassis members, a supplemental spring mounted on another relatively movable chassis member, and a lever system interposed between the said members and the free ends of the said springs and acting to successively couple the latter in series and in parallel and to concurrently increase the flexures thereof when the system is respectively subjected to compression and to expansion shocks.

4. An elastic support system for relatively movable members which comprises the combination of a plurality of springs interposed therebetween, means conjoining said springs in superimposed or series relationship and imposing thereon a progressively increased flexure when the said members are forced toward each other, and other means conjoining said springs in parallel and subjecting them to coincidently augmented strains when the said members are separated beyond the position of static equilibrium.

5. In an elastic support system for vehicles the combination of a plurality of springs interposed between the relatively oscillating members of the vehicle chassis, a lever system conjoining said members with the said springs and acting to successively couple the latter in series and in multiple relationship when the chassis members are respectively displaced in opposite directions from normal load position, and means for damping or retarding the recoil of the said members from their displaced positions.

6. In an elastic support system for vehicle bodies the combination of a main spring, a supplemental spring normally connected in series therewith and subjected to progressively increased flexure when the main spring is subjected to an increased load stress, means conjoining said springs with the relatively oscillating members of the vehicle chassis and acting to couple them in parallel relationship when the system is subjected to rebound or expansion shocks, and other means for damping the recoil or return of the elastically strained suspension units to the normal position of static equilibrium.

7. In an elastic suspension system for the relatively movable members of a vehicle chassis the combination of a plurality of springs interposed between the said members, a lever connected at one end with the contiguous extremities of the said springs, and pivotally mounted at another point on one of the said movable members, and a flexible "one way" connection between a third point on the said lever and the other of said movable members whereby all of said springs are subjected to increased flexure when the members are moved from static load position.

8. An elastic suspension system for vehicles which comprises an air spring, means for dividing the fluid pressure chamber of said spring into two compartments when the said chamber is expanding, a series of packing rings for retarding leakage of fluid from the high pressure compartment, and means for intermittently returning any such leakage to the other compartment during said expansion.

9. An elastic suspension unit for vehicle bodies which comprises two mutually reciprocable hollow members, a series of packing rings for retarding leakage of fluid from the chamber enclosed by said members, an inner plunger adapted to divide said chamber into two compartments, means for establishing a free communication between said compartments when the volume of the enclosed chamber is diminished by the relative approach of the reciprocable members and for closing said communication when the volume of said chamber is increased by the reverse movement of said members, and a valve controlled passageway leading from a point between said packing rings to one of said compartments.

10. An elastic suspension unit for two relatively movable members which comprises a pair of hollow cup shaped bodies that are respectively attached to the relatively movable members, an inner plunger that is secured to one of said bodies and is slidably engaged with the other of them, a coil spring interposed between said inner plunger and the relatively movable body, and means for intermittently opening and closing communication between the chambers on the two sides of the inner plunger as the movable members oscillate, about their normal or median position.

11. An elastic suspension system for vehicles which comprises in combination a main spring, a supplemental air spring normally coupled in series therewith and subjected to progressively increased compression when the main spring is subjected to increased load stress, an auxiliary coil spring, and means conjoining said springs with the body and axle members of the vehicle and acting to impose simultaneously increased flexures on the said main spring and the said coil spring when the system is subjected to rebound or expansion stresses.

12. An elastic suspension system for vehicle bodies which comprises the combination of a main leaf spring, a supplemental fluid pressure spring, means conjoining said springs in series relationship and acting to impose progressively increased strains thereon when the vehicle body is forced toward the axle member by an augmented load stress, a coil spring, and means for connecting said coil spring in parallel with said main spring and subjecting these springs to simultaneously increased flexures when the system is called upon to resist rebound or expansion stresses.

13. An elastic suspension system for vehicle bodies which comprises the combination of a main spring, a supplemental fluid pressure spring normally connected in series with said main spring, a coil spring mounted in parallel relationship to said fluid pressure spring, means connecting said coil spring in parallel with said main spring when the system is subjected to expansion stress, and means for damping the recoil of the system when the suspension units have been displaced from normal load position.

14. In an elastic suspension system for vehicles the combination of a main spring, a supplemental air spring cooperating in series therewith to resist the effect of compression shocks, an auxiliary coil spring interposed between relatively movable parts of the said air spring, a lever system connecting said main and auxiliary springs in parallel with the body and axle members of the vehicle and acting to coincidently impose increased flexural strains thereon when the said members are separated beyond normal load position, and means for pneumatically damping the recoil of the system after it has been subjected to compression or expansion stresses.

In testimony whereof I have hereunto set my hand.

FRANK L. O. WADSWORTH.